US011467717B2

(12) United States Patent
Gross

(10) Patent No.: US 11,467,717 B2
(45) Date of Patent: *Oct. 11, 2022

(54) OPTIMIZING WINDOW RESIZE ACTIONS FOR REMOTED APPLICATIONS

(71) Applicant: VMware, Inc., Palo Alto, CA (US)

(72) Inventor: Adam Gregory Gross, Dexter, MI (US)

(73) Assignee: VMware, Inc., Palo Alto, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/737,207

(22) Filed: Jan. 8, 2020

(65) Prior Publication Data

US 2020/0142571 A1  May 7, 2020

Related U.S. Application Data

(63) Continuation of application No. 15/081,678, filed on Mar. 25, 2016, now Pat. No. 10,564,829.

(51) Int. Cl.
| G06F 3/04845 | (2022.01) |
| G06F 3/14 | (2006.01) |
| H04L 67/01 | (2022.01) |

(52) U.S. Cl.
CPC ........ *G06F 3/04845* (2013.01); *G06F 3/1454* (2013.01); *H04L 67/01* (2022.05)

(58) Field of Classification Search
CPC . G06F 3/048; G06F 3/14; G06F 15/17; H04L 67/00
See application file for complete search history.

(56) References Cited

U.S. PATENT DOCUMENTS

| 6,018,340 | A | 1/2000 | Butler |
| 6,271,839 | B1 | 8/2001 | Mairs et al. |
| 6,710,790 | B1 | 3/2004 | Fagioli |
| 6,850,249 | B1 | 2/2005 | Gu |
| 7,168,048 | B1 | 1/2007 | Goosen et al. |
| 7,477,205 | B1 | 1/2009 | de Waal et al. |
| 7,484,183 | B2 | 1/2009 | Look |
| 7,533,189 | B2 | 5/2009 | Mahajan |
| 7,791,559 | B2 | 9/2010 | Piasecki |

(Continued)

OTHER PUBLICATIONS

International Search Report and Written Opinion—PCT/US2016/033272—ISA/EPO—dated Sep. 20, 2016.

*Primary Examiner* — Jennifer N Welch
*Assistant Examiner* — Qi Wan

(57) ABSTRACT

Techniques for optimizing window resize actions for a remoted application are provided, where the remoted application has a server-side window running within a remote desktop of a server system, and where the server-side window is made accessible to a user of a client system as a client-side window displayed in a client desktop of the client system. In one embodiment, the client system can receive from the server system a notification that the server-side window is being resized in the remote desktop, and can determine that the user is currently entering one or more input commands for resizing the server-side window. In response, the client system can send a message to the server system for canceling the resizing of the server-side window. The client system can then allow the user to resize the client-side window via the one or more input commands, while the server-side window remains a fixed size.

18 Claims, 8 Drawing Sheets

(56) References Cited

U.S. PATENT DOCUMENTS

| | | |
|---|---|---|
| 8,127,233 B2 | 2/2012 | McDowell |
| 8,176,434 B2 | 5/2012 | Saul |
| 8,341,208 B2 | 12/2012 | Mazzaferri |
| 8,549,093 B2 | 10/2013 | Cohen |
| 8,713,474 B2 | 4/2014 | Desai |
| 8,769,428 B2 | 7/2014 | Mir |
| 8,774,536 B1 | 7/2014 | Jia et al. |
| 8,970,492 B2 | 3/2015 | Butner |
| 9,032,325 B2 | 5/2015 | Janssen |
| 9,093,050 B1* | 7/2015 | Orlov .................. G09G 5/39 |
| 9,210,213 B2 | 12/2015 | Momchilov et al. |
| 9,225,611 B1 | 12/2015 | Bagrinovskiy |
| 9,395,869 B2 | 7/2016 | Holland |
| 9,406,281 B2 | 8/2016 | Lee |
| 9,635,091 B1 | 4/2017 | Laukkanen |
| 9,674,265 B2 | 6/2017 | Agrawal |
| 10,082,941 B2 | 9/2018 | Gross et al. |
| 2002/0057295 A1 | 5/2002 | Panasyuk et al. |
| 2002/0165922 A1 | 11/2002 | Wei |
| 2002/0169743 A1 | 11/2002 | Arnold et al. |
| 2003/0061333 A1 | 3/2003 | Dean et al. |
| 2003/0085922 A1 | 5/2003 | Wei |
| 2003/0128436 A1* | 7/2003 | Ishii .................. G02B 27/01 359/630 |
| 2005/0168471 A1 | 8/2005 | Paquette |
| 2006/0069797 A1 | 3/2006 | Abdo et al. |
| 2006/0136828 A1 | 6/2006 | Asano |
| 2006/0136835 A1 | 6/2006 | Hochmuth et al. |
| 2006/0195791 A1 | 8/2006 | Johanson et al. |
| 2006/0230156 A1 | 10/2006 | Shappir et al. |
| 2006/0267857 A1 | 11/2006 | Zhang et al. |
| 2006/0288306 A1* | 12/2006 | Mahajan ............. G06F 9/452 715/804 |
| 2007/0139373 A1 | 6/2007 | Simon |
| 2007/0171921 A1 | 7/2007 | Wookey et al. |
| 2007/0174410 A1 | 7/2007 | Croft et al. |
| 2007/0288599 A1 | 12/2007 | Saul et al. |
| 2008/0155454 A1 | 6/2008 | Balasubramanian |
| 2008/0168479 A1 | 7/2008 | Purtell et al. |
| 2009/0070404 A1 | 3/2009 | Mazzaferri |
| 2009/0094523 A1 | 4/2009 | Treder et al. |
| 2009/0119365 A1 | 5/2009 | Tomic |
| 2009/0210817 A1 | 8/2009 | Schmieder |
| 2009/0307428 A1 | 12/2009 | Schmieder et al. |
| 2009/0327468 A1* | 12/2009 | Hirsch .................. G06F 9/54 709/223 |
| 2010/0056173 A1 | 3/2010 | Bloom et al. |
| 2010/0207957 A1 | 8/2010 | Taneja et al. |
| 2010/0253693 A1 | 10/2010 | Streatch et al. |
| 2010/0269057 A1 | 10/2010 | Pahlavan et al. |
| 2010/0271379 A1 | 10/2010 | Byford |
| 2011/0099481 A1 | 4/2011 | Bitonti |
| 2011/0115800 A1 | 5/2011 | Desai |
| 2011/0138295 A1 | 6/2011 | Momchilov |
| 2011/0157189 A1 | 6/2011 | Diard |
| 2011/0219313 A1 | 9/2011 | Mazzaferri |
| 2011/0219331 A1 | 9/2011 | Deluca |
| 2011/0246904 A1 | 10/2011 | Pinto |
| 2011/0271226 A1 | 11/2011 | Janssen |
| 2012/0001832 A1 | 1/2012 | Braghis et al. |
| 2012/0002715 A1 | 1/2012 | Matsui et al. |
| 2012/0005269 A1 | 1/2012 | Janssen |
| 2012/0054671 A1 | 3/2012 | Thompson |
| 2012/0092277 A1 | 4/2012 | Momchilov |
| 2012/0127206 A1 | 5/2012 | Thompson |
| 2012/0143993 A1 | 6/2012 | Russo et al. |
| 2012/0224060 A1* | 9/2012 | Gurevich ............. B60R 1/00 348/148 |
| 2012/0242574 A1 | 9/2012 | Munehiro et al. |
| 2012/0319927 A1 | 12/2012 | Khatib |
| 2012/0324365 A1 | 12/2012 | Momchilov et al. |
| 2013/0031481 A1 | 1/2013 | Schreifels |
| 2013/0125009 A1 | 5/2013 | Deluca |
| 2013/0144521 A1* | 6/2013 | Mathieu ........... G06K 9/00832 701/410 |
| 2013/0204927 A1 | 8/2013 | Kruglikov |
| 2013/0290856 A1 | 10/2013 | Beveridge |
| 2013/0290857 A1 | 10/2013 | Beveridge et al. |
| 2014/0002361 A1* | 1/2014 | Ballard ................ G09G 5/12 345/163 |
| 2014/0006634 A1 | 1/2014 | Eacott et al. |
| 2014/0293433 A1* | 10/2014 | Hashimoto ........... G09G 3/02 359/630 |
| 2014/0379260 A1* | 12/2014 | Maihoefer .......... G01C 21/365 701/538 |
| 2015/0031350 A1 | 1/2015 | Haggett et al. |
| 2015/0127716 A1* | 5/2015 | Agrawal ............. G06F 9/452 709/203 |
| 2015/0149900 A1 | 5/2015 | Kawabata |
| 2015/0163281 A1 | 6/2015 | Liu |
| 2015/0220242 A1 | 8/2015 | Guest et al. |
| 2015/0363082 A1 | 12/2015 | Zhao |
| 2016/0072872 A1 | 3/2016 | Li |
| 2016/0104460 A1 | 4/2016 | Kiichle-Gross et al. |
| 2017/0038595 A1* | 2/2017 | Kutomi ................ G09G 5/38 |
| 2017/0277408 A1 | 9/2017 | Gross |
| 2019/0171011 A1* | 6/2019 | Ogasawara ....... G02B 27/0179 |

* cited by examiner

*During Resize*

OPTIMIZING WINDOW RESIZE ACTIONS FOR REMOTED APPLICATIONS

CROSS REFERENCE TO RELATED APPLICATION

This application is a continuation application and pursuant to 35 U.S.C. § 120 is entitled to and claims the benefit of earlier filed application U.S. application Ser. No. 15/081,678, filed Mar. 25, 2016, now U.S. Pat. No. 10,564,829, issued Feb. 18, 2020, the content of which is incorporated herein by reference in its entirety for all purposes.

BACKGROUND

Application remoting, or "app remoting," is a technology that enables an application running in a remote desktop on a server system to be accessed via a client desktop on a client system. Such an application is known as a remoted application. Typically, the remoted application comprises an application window that is presented within the remote desktop (referred to herein as the "server-side application window"). As part of the app remoting process, this server-side application window is made accessible to a user of the client system in the form of a corresponding window that is rendered in the client desktop (referred to herein as the "client-side application window"). The client-side application window is updated on a continuous basis to mirror the status and contents of the server-side application window.

One challenge with implementing app remoting involves efficiently handing window resize actions. In scenarios where the operating system-level "show window contents while dragging" option is enabled in the remote desktop, a resize of the server-side application window will cause the entirety of the window to be dynamically refreshed in the remote desktop as the resize occurs. This in turn, will cause a large number of framebuffer updates (e.g., one every few milliseconds (ms)) to be generated and sent from the server system to the client system in order to synchronize the display of the client-side application window with the server-side application window. The generation and transmission of these resize-induced framebuffer updates can consume a significant amount of compute resources on the server system, as well as a significant amount of network bandwidth between the server and client.

Certain app remoting implementations address this issue by detecting when the user has initiated a "left-click-and-drag" operation on one or more standard resize regions of the client-side application window and, upon detecting this specific operation, optimizing the window resize process on the client side. These standard resize regions typically comprise the borders (i.e., edges and corners) of the window. However, a drawback of this approach is that some applications allow window resize actions to be initiated using left-click-and-drag on non-standard resize regions (e.g., regions that are within, or not exactly aligned with, the window borders). Accordingly, for these and other similar applications, the optimization approach noted above is not sufficient for optimizing window resize actions in all possible scenarios.

SUMMARY

Techniques for optimizing window resize actions for a remoted application are provided, where the remoted application has a server-side application window running within a remote desktop of a server system, and where the server-side application window is made accessible to a user of a client system in the form of a client-side application window displayed in a client desktop of the client system. In one embodiment, the client system can receive from the server system a notification that the server-side application window is being resized in the remote desktop, and can determine that the user is currently entering one or more input commands for resizing the server-side application window. In response, the client system can send a message to the server system for canceling the resizing of the server-side application window. The client system can then allow the user to resize the client-side application window in the client desktop via the one or more input commands, while the server-side application window remains a fixed size in the remote desktop.

The following detailed description and accompanying drawings provide a better understanding of the nature and advantages of particular embodiments.

DETAILED DESCRIPTION

Figure 1:
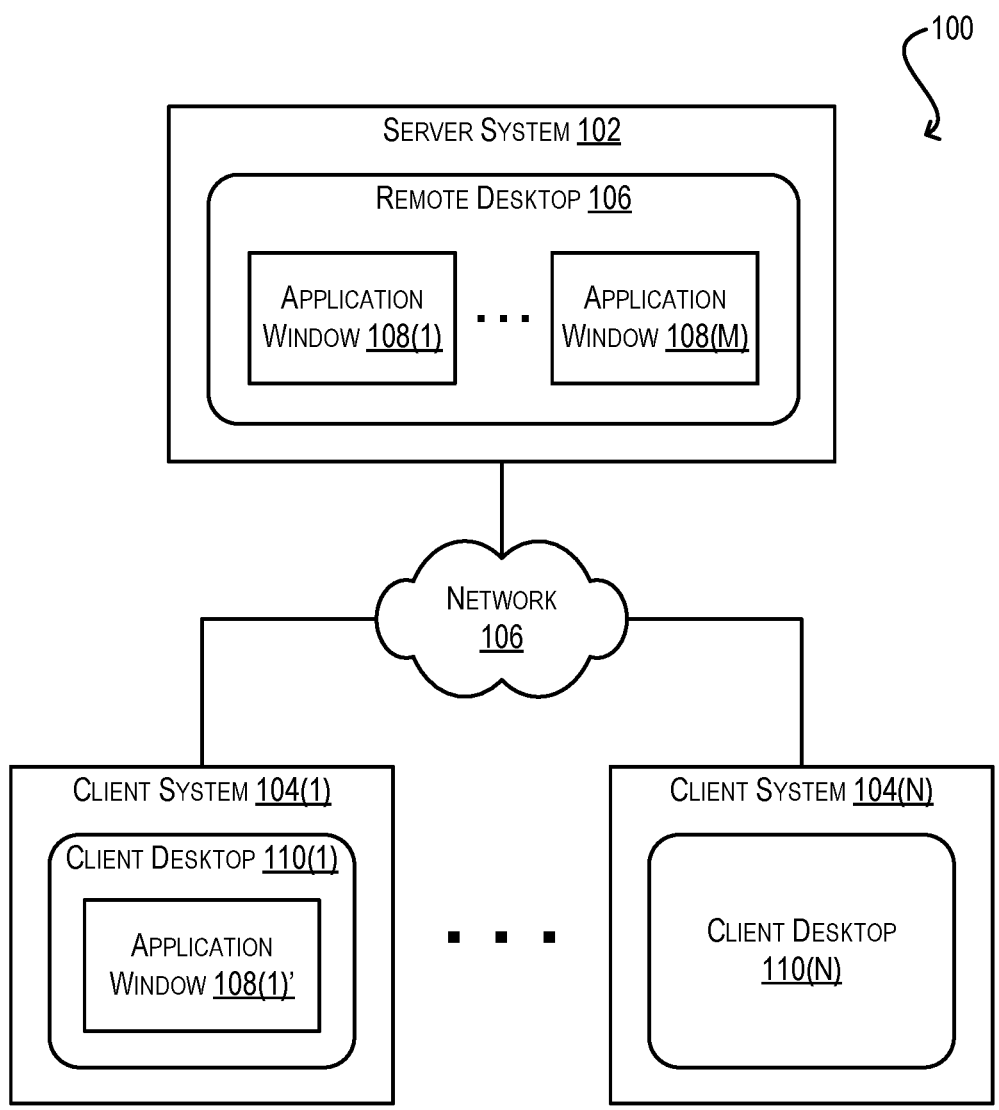
FIG. 1 depicts a system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques for optimizing window resize actions carried out with respect to remoted applications. In particular, these techniques can reduce the amount of CPU and network bandwidth resources needed to perform such window resize actions, regardless of how the actions are initiated by a user.

According to one set of embodiments, a client system can receive, from a server system, a notification that a server-side application window of a remoted application (i.e., an application window running within a remote desktop on the server system and presented, in the form of a client-side application window, in a client desktop on the client system) is being actively resized. For example, a user of the client system may have initiated a left-click-and-drag operation on a portion the client-side application window in the client desktop to initiate the resize action.

Upon receiving this notification from the server system, the client system can check whether the user is currently entering any input commands that indicate the window resize action is still taking place. For instance, the client system can check whether the user currently has the left mouse button held down (indicating a left-click-and-drag operation). If so, the client system can send a message to the server system (e.g., a "left-mouse-button-up" event) that causes the resizing of the server-side application window in the remote desktop to be stopped/canceled. The client system can then place the client-side application window into a resizing state (if not already in such a state) and can allow the user to freely resize the client-side application window in the client desktop via his/her current inputs (e.g., left-click-and-drag), while the server-side application window in the remote desktop remains a fixed size.

Once the user has completed the window resize action (by, e.g., letting go of the left mouse button), the client system can determine the final size of the client-side application window in the client desktop, which may be different from the size of the server-side application window in the remote desktop. Finally, the client system can send a request to the server system for resizing the server-side application window according to the determined final size. In this way, the client system can re-synchronize the sizes of the windows in the two desktops at the conclusion of the resize action.

With the high-level approach described above, the execution of window resize actions can be significantly less burdensome on the CPU(s) of the server system and the network link(s) between the server and client systems, particularly when the operating system-level "show window contents while dragging" option is enabled on the server-side. This is because the resizing is handled with respect to the client-side application window in the client desktop, without resizing the server-side application window in the remote desktop until the action is completed (and thus eliminating the need to send a large volume of framebuffer updates from the server system to the client system during the resize).

In certain embodiments, the client-side application window can be live-updated to reflect the contents of the server-side application window during the optimized resize workflow above. The particular manner in which this live-updating is accomplished can differ depending upon whether the "show window contents while dragging" option is enabled or disabled in the client desktop. If this option (also referred to as "full window drag") is disabled in the client desktop, once the client system has transmitted the "resize cancel" message to the server system, the client system can determine a fixed source rectangle for the server-side application window within remote desktop framebuffer updates received from the server system. This fixed source rectangle corresponds to the fixed position/size of the server-side application window within the remote desktop. The client system can then copy (e.g., blit) the contents of the fixed source rectangle from the received framebuffer updates into the client-side application window, while the client-side window is being resized by the user. Since full window drag is disabled on the client-side in this scenario, the size of the client-side application window will not actually change until the resize action is completed (e.g., the user has released the left mouse button); in other words, there will be a one-to-one correspondence between the sizes of the client-side and server-side windows during the resize process. As a result, the client system can perform this blitting without having to worry about scaling the source rectangle in order to properly fill the client-side application window.

The situation is different if full window drag is enabled in the client desktop, since the client-side operating system will actively refresh/redraw the entirety of the client-side application window while it is being resized. This means that the size of the client-side application window will deviate from the size of the server-side application window during the resize action (since the server-side window will remain fixed in size, while the client-side window will actively change in size based upon the user's inputs). This will require the client system to scale the source rectangle before drawing it into the client-side window, which can lead to visually noticeable scaling artifacts on the client-side.

To address this problem, in the "full window drag enabled" scenario the client system can send, while the resize is in progress, messages on a periodic basis to the server system (e.g., once every 100 ms, 250 ms, etc.) that instruct the server system to resize the server-side application window in the remote desktop to match the current size of the client-side application window in the client desktop. Thus, when updated contents of the server-side application window are captured via framebuffer updates and sent to the client system for live-updating of the client-side application window, the source rectangle will more closely match the actual size of the client-side window and only a relatively small amount of scaling (if any at all) will be needed to blit it. This can minimize the visual artifacts associated with the resize process, while at the same time requiring less CPU and network bandwidth resources than the non-optimized approach of resizing the server-side application window on a continuous basis during the resize.

These and other features of the present disclosure are described in further detail in the sections that follow.

FIG. 1 depicts a high-level system environment 100 that supports app remoting according to an embodiment. As shown, system environment 100 includes a server system 102 that is communicatively coupled with a number of client systems 104(1)-(N) via a network 106. Server system 102, which may be a Remote Desktop Session Host (RDSH) server, hosts a remote desktop 106 that includes a number of running applications (shown in the form of server-side application windows 108(1)-(M)). As used herein, a "desktop" is a graphical computing environment in which a user can launch, interact with, and manage his/her applications, settings, and data.

Each client system 104(1)-(N), which may be a desktop computer, a laptop computer, a smartphone, a tablet, or the like, executes its own local (i.e., client) desktop 110(1)-(N). In various embodiments, client systems 104(1)-(N) can interoperate with server system 102 via an app remoting infrastructure (not shown). Through this interoperation, users of client systems 104(1)-(N) can remotely access one or more of the applications of remote desktop 106 via respective client desktops 110(1)-(N). For example, in the embodiment of FIG. 1, server-side application window 108(1) of remote desktop 106 is made accessible to a user of client system 104(1) as a client-side application window 108(1)' in client desktop 110(1). By interacting with client-side application window 108(1)' (which essentially contains a streamed image of server-side application window 108(1)), the user can access the application as if it were running locally on client system 104(1).

It should be appreciated that system environment 100 of FIG. 1 is illustrative and various modifications are possible. For example, although client desktop 110(1) of client system 104(1) is shown as including a single client-side application window 108(1) corresponding to a single server-side application window 108(1) running in remote desktop 106, in other embodiments client desktop 110(1) may include multiple client-side application windows corresponding to multiple server-side application windows. In these embodiments, the multiple server-side application windows may all run in the same remote desktop 106, or in different remote desktops. Further, the various entities shown in FIG. 1 may be arranged according to other configurations and/or may include subcomponents or functions that have not been specifically described. One of ordinary skill in the art will recognize many variations, modifications, and alternatives.

Figure 2:
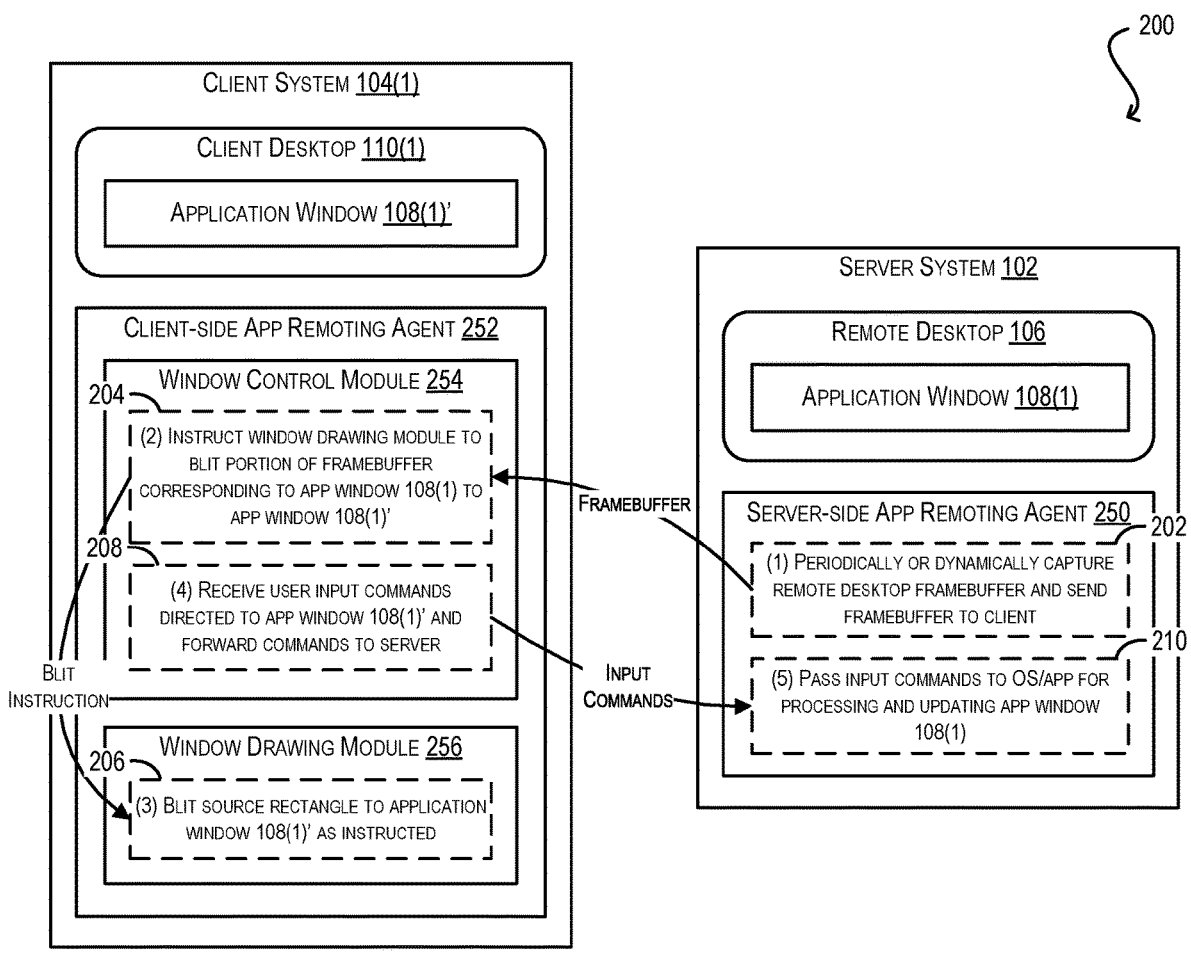
FIG. 2 depicts a workflow for performing app remoting according to an embodiment.

FIG. 2 depicts a more detailed view of client system 104(1) and server system 102, as well as a workflow 200 that enables the remoting of server-side application window 108(1) according to an embodiment. Starting with step (1) of workflow 200 (reference numeral 202), a server-side app remoting agent 250 of server system 102 can periodically capture an image (e.g., framebuffer) of remote desktop 106 and can send, via a remoting protocol, the framebuffer (or an updated portion thereof) to a client-side app remoting agent 252 on client system 104(1). This can occur at fixed time intervals, or dynamically whenever a visual change/update is detected in remote desktop 106 or server-side application window 108(1).

Upon receiving the remote desktop framebuffer, a window control module 254 of client-side agent 252 can instruct a window drawing module 256 to copy, or "blit," a portion of the framebuffer corresponding to server-side application window 108(1) (referred to as the "source rectangle") into client-side application window 108(1)' of client desktop 110(1) (step (2), reference numeral 204). Window drawing module 256 can then perform this blitting as instructed, thereby enabling the user to see a real-time (or near real-time) representation of server-side application window 108(1) through client-side application window 108(1)' (step (3), reference numeral 206).

Simultaneously with steps (1)-(3), window control module 252 can receive user input commands directed to client-side application window 108(1)' and can forward the input commands, via the remoting protocol, to server-side agent 250 (step (4), reference numeral 208). At step (5) (reference numeral 210), server-side agent 250 can pass the input commands to the operating system (OS) layer of remote desktop 106 (and/or to the application owning window 108(1)). The OS/application can then process the input commands and update the visual state of server-side application window 108(1) as needed (not shown). If the visual state of server-side window 108(1) has changed, these changes will be propagated back to client-side agent 252 via the framebuffer updates described with respect to step (1). This, in turn, will cause client-side application window 108(1)' in client desktop 110(1) to be updated appropriately.

As mentioned previously, the act of resizing a remoted application window can put a significant strain on the server compute and network bandwidth resources of system environment 100 due to the large volume of framebuffer updates that need to be generated and sent from server system 102 to client systems 104 (when full window drag is enabled on the server-side). There are existing techniques that work around this problem by detecting a left-click-and-drag operation on standard resize regions of a client-side application window and optimizing the window resize process in this specific scenario. However, these existing techniques still result in high server CPU/network bandwidth usage if the remoted application allows window resize actions to be initiated via non-standard resize regions.

Figure 3:
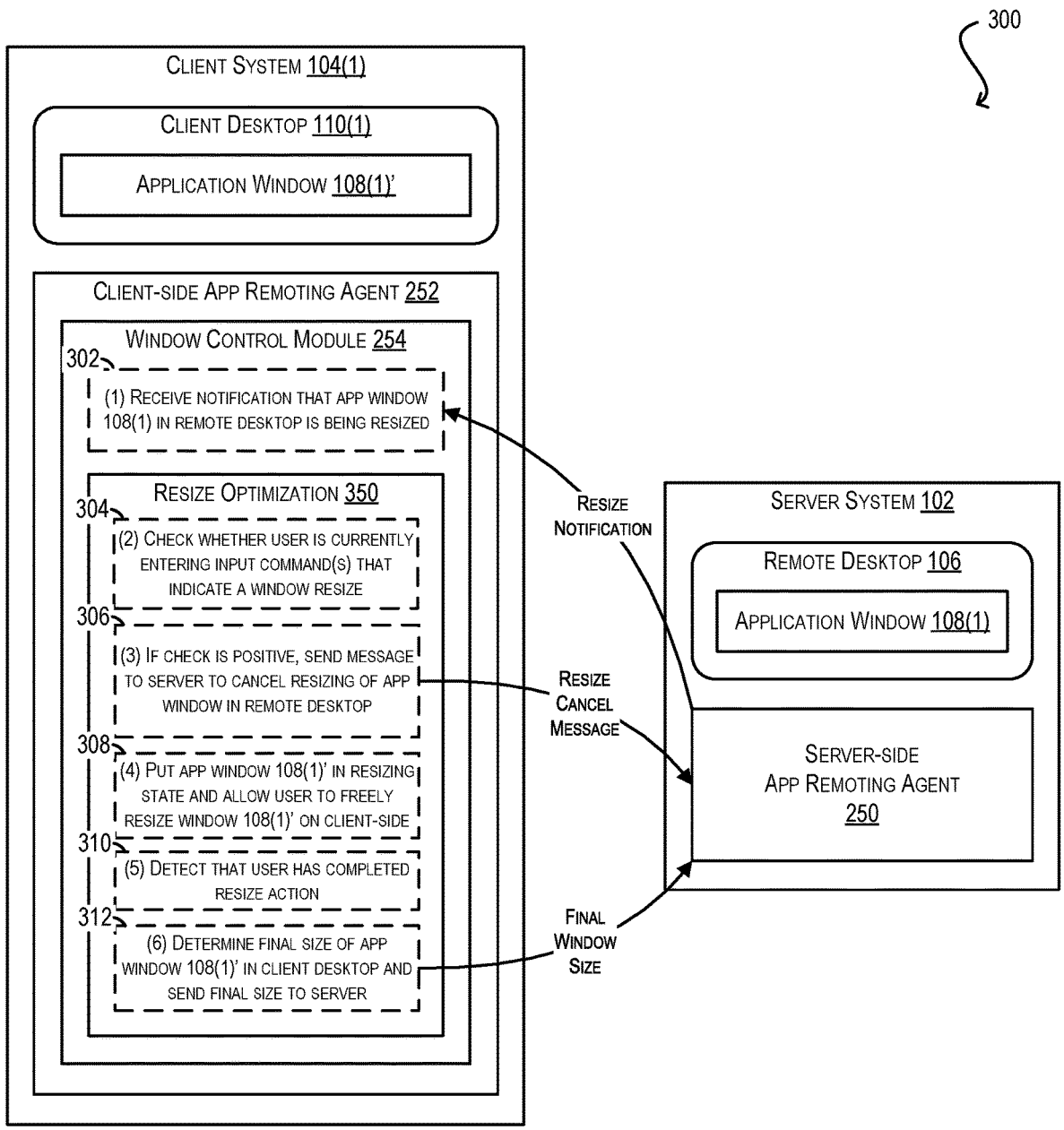
FIG. 3 depicts a workflow for optimizing window resize actions for a remoted application according to an embodiment.

To address the foregoing and other similar issues, FIG. 3 depicts a workflow 300 that can be performed by client system 104(1) for optimizing user-initiated resizes of window 108(1)/108(1)' according to an embodiment. This workflow is enabled by a novel resize optimization component 350 added to window control module 254 of client-side agent 252. With workflow 300, the user of client system 104(1) can resize client-side application window 108(1)' (and thus, server-side application window 108(1)) as desired with minimal strain on server system 108 or the network connection between the two systems.

Starting with step (1) of workflow 300 (reference numeral 302), window control module 254 can receive, from server-side agent 250, a notification that application window 108(1) in remote desktop 106 is being actively resized (indicating that the user may have initiated a window resize action from the client side). There are different ways in which server-side agent 250 can detect this resizing, which may vary depending on the OS that is running remote desktop 106. For example, in Windows, this detection can be carried out by detecting "WM_SIZING" messages that are sent to window 108(1) during the resize process. In a particular embodiment, the notification can identify the window being resized and the window edge or corner from which the resizing was initiated.

At step (2) (reference numeral 304), resize optimization component 350 can check whether the user is currently entering any input commands that indicate a window resize action is in progress. For instance, resize optimization component 350 can check whether the user currently has the left mouse button held down (indicating a left-click-and-drag operation). Resize optimization component 350 can also check for other types of input commands, such as whether the user is depressing an arrow key on his/her keyboard.

If the check at step (2) indicates that the user is not currently entering a window resize command, workflow 300 can end (not shown). However, if the check indicates that the user is currently entering such a command, component 350 can initiate a resize optimization process as shown in the remaining steps of workflow 300. In particular, at step (3) (reference numeral 306), resize optimization component 350 can send a message to server-side agent 250 that cancels the resizing of server-side application window 108(1) within remote desktop 106. For example, this "resize cancel" message can include a "left-mouse-button-up" event, or any other event/command that forces application window 108(1) to stop resizing on the server side.

Resize optimization component 350 can then place client-side application window 108(1)' into a resizing state (if needed) and allow the user to freely resize window 108(1)' using the input commands detected at step (1), without synchronizing the resize action to server system 102 (step (4), reference numeral 308). In one embodiment, placing client-side application window 108(1)' into a resizing state can involve injecting an OS-level command or message into window 108(1)', such as a "WM_NCLBUTTONDOWN" message in Windows. Note that while client-side application window 108(1)' is being resized at step (4), server-side application window 108(1) remains a fixed size, thereby avoiding the need to send continuous framebuffer updates (caused by changes in the size of server-side window 108(1)) from server system 102 to client system 104(1).

At step (5) (reference numeral 310), resize optimization component 350 can detect that the user has completed the window resize action (by, e.g., letting go of the left mouse button or otherwise ceasing to provide the input command(s) that initiated the resize). Finally at step (6) (reference numeral 312), resize optimization component 350 can determine the final size of client-side application window 108(1)' in client desktop 110(1) and can send a request to server-side agent 250 to resize server-side application window 108(1) in remote desktop 106 to the determined final size. This can cause server system 102 to fulfill the resize request (not shown), thereby synchronizing the sizes of the client-side and server-side windows.

Figure 4A:
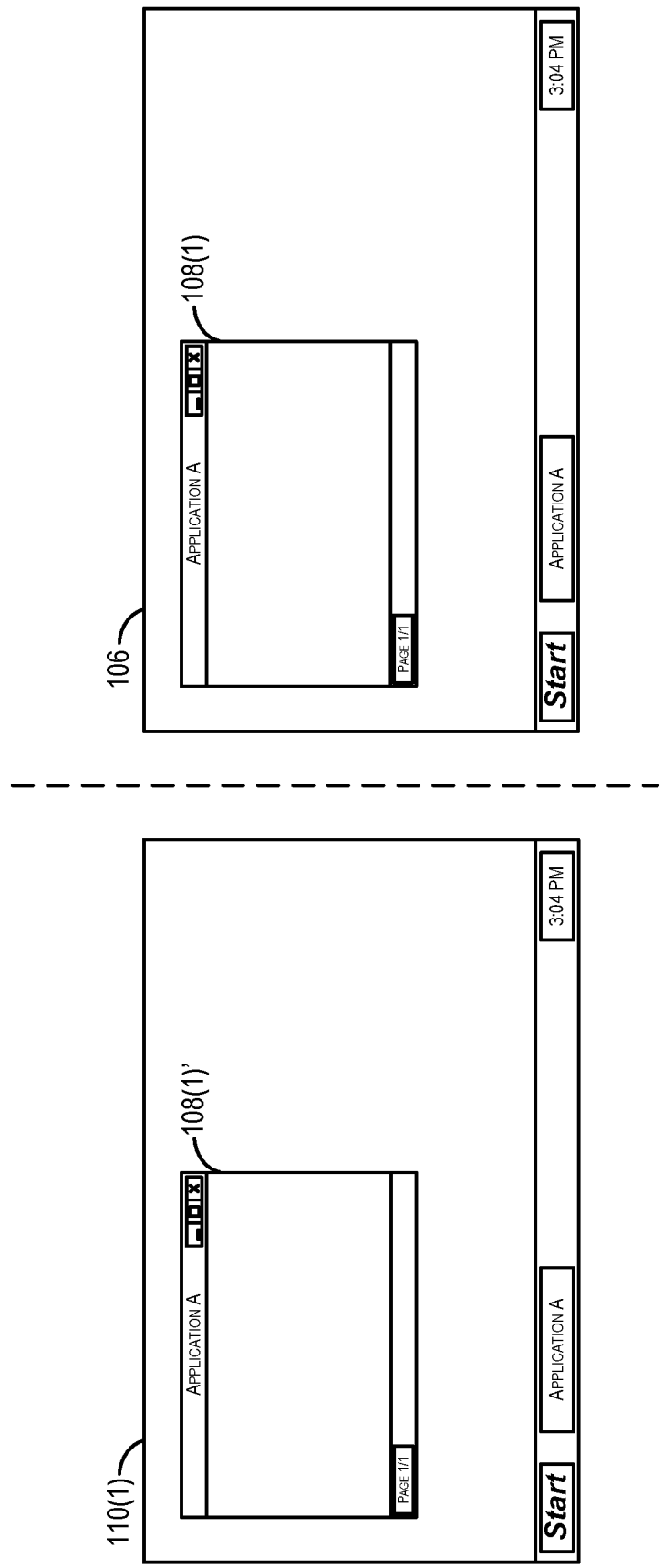
FIGS. 4A, 4B, and 4C illustrate the sizes of a server-side application window and a client-side application window in remote and client desktops respectively before, during, and after the workflow of FIG. 3 according to an embodiment.
Figure 4B:
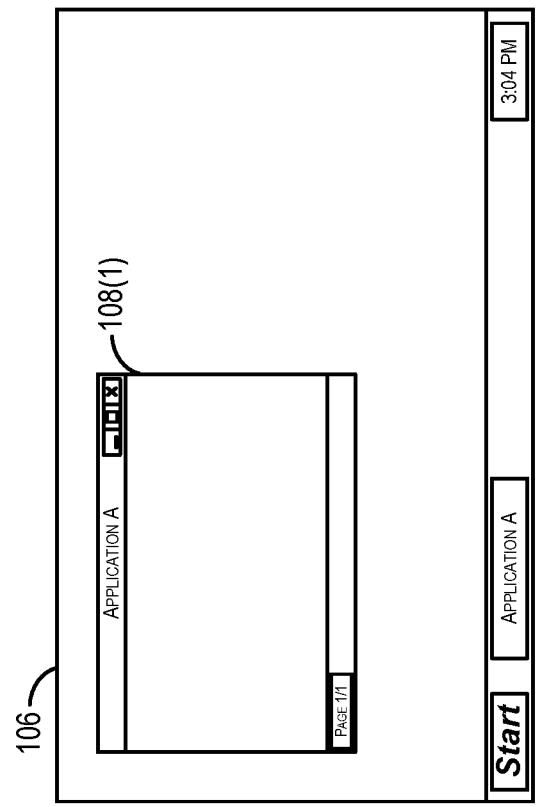
Figure 4B:
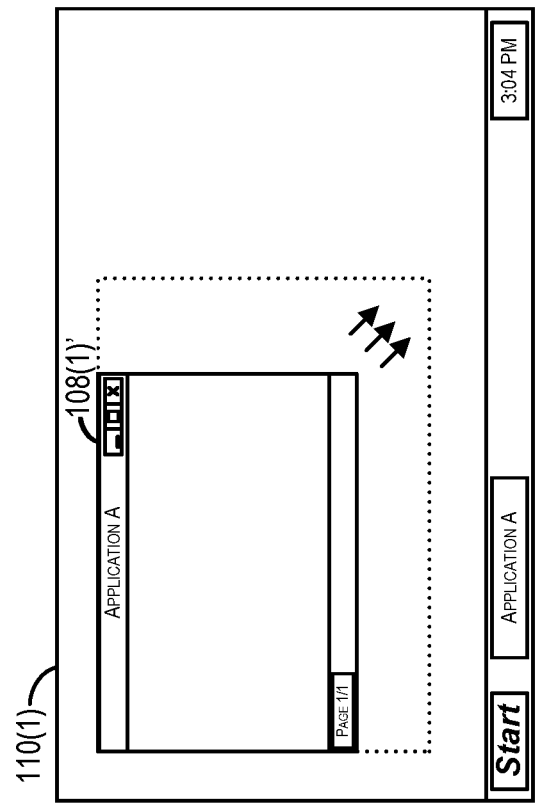
Figure 4C:
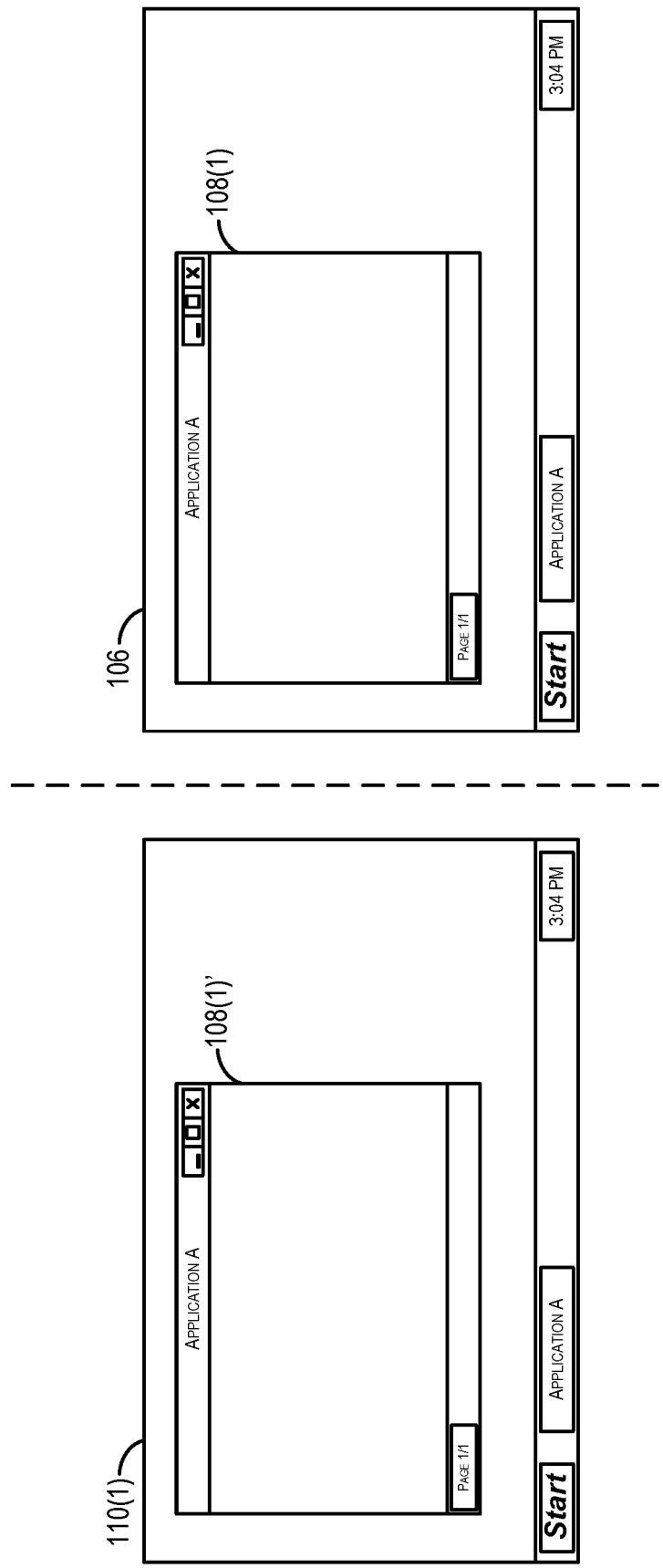

To further clarify the processing of workflow 300, FIGS. 4A, 4B, and 4C depict a series of diagrams 400, 402, and 404 that show the relative sizes of client-side application window 108(1)' in client desktop 110(1) and server-side application window 108(1) in remote desktop 106 before, during, and after a user-initiated resize action.

Starting with diagram 400 of FIG. 4A, client-side application window 108(1)' and server-side application window 108(1) are shown as being the same size (and located at the same position) in their respective desktops. This is because the windows are in-sync, and a resize action has not yet occurred to disrupt this synchronization.

In diagram 402 of FIG. 4B, client-side application window 108(1)' is in the process of being resized in client desktop 110(1). In contrast, server-side application window 108(1) has not changed in size (or has only changed a small amount) in remote desktop 106. This is because the resizing of client-side application window 108(1)' has been effectively decoupled from server-side application window 108(1) per steps (3) and (4) of workflow 300.

Finally, in diagram 404 of FIG. 4C, windows 108(1)' and 108(1) are once again synchronized and occupy the same size in their respective desktops. This new size is different from the original size in FIG. 4A, and reflects the final size of client-side application window 108(1)' at the conclusion of the resize action.

As mentioned previously, in certain embodiments client-side agent 252 can "live-update" client-side application window 108(1)' during the optimized resize processing of workflow 300. In other words, client-side agent 252 can dynamically display the most current contents of the server-side application window 108(1) within client-side application window 108(1)', while client-side window 108(1)' is being actively resized. The particular techniques by which this live-updating is accomplished can differ depending on whether full window drag is enabled or disabled in client desktop 110(1).

Figure 5:
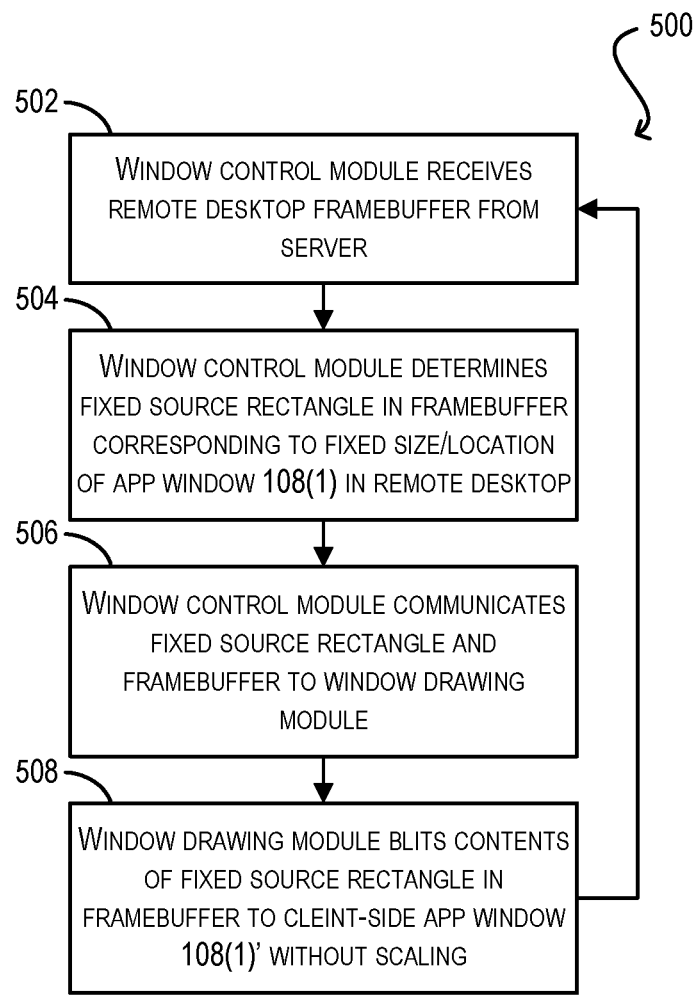
FIG. 5 depicts a first flowchart for performing live-updating of a client-side application window during a window resize action according to an embodiment.

When full window drag is disabled in client desktop 110(1), client system 104(1) generally will not refresh/redraw the entirety of client-side application window 108(1)' while the resize action is in progress; instead, client system 104 will simply display a dynamic outline of the resized window boundaries (as shown in FIG. 4B). This means that the sizes of the client-side and server-side windows will remain the same until the resize action is completed, and thus client-side agent 252 can perform one-to-one drawing of the contents of server-side window 108(1) into client-side window 108(1)'. This process is shown as flowchart 500 in FIG. 5. It is assumed that flowchart 500 is performed by client-side agent 252 during step (4) of workflow 300 (i.e., while the user of client system 104(1) is resizing client-side application window 108(1)' in client desktop 110(1)).

At block 502 of flowchart 500, window control module 254 of client-side agent 252 can receive a remote desktop framebuffer update from server-side agent 250. Upon receiving this framebuffer update, window control module 254 can determine a fixed source rectangle in the framebuffer that corresponds to the fixed size/position of server-side application window 108(1)' in remote desktop 106 (block 504).

At block 506, window control module 254 can communicate the fixed source rectangle and the framebuffer (or a pointer to the framebuffer) to window drawing module 256. Window drawing module 256 can then blit the contents of the fixed source rectangle to client-side application window 108(1)' in client desktop 110(1) in a one-to-one fashion (i.e., without scaling) (block 508). Finally, flowchart 500 can return to block 502 so that further framebuffer updates from server-side agent 250 can be processed in the same manner.

As indicated above, since server-side application window 108(1) is forced to stop resizing per step (3) of workflow 300, and since client-side application window 108(1)' does not actually change in size during the resizing performed at step (4) of workflow 300 if full window drag is disabled on the client-side, the size of the server-side window (and thus, the source rectangle) will match the size of the client-side window for each loop iteration of flowchart 500 (i.e., for the duration of a single resize action).

However, if full window drag is enabled in client desktop 110(1), client system 104(1) will actively resize the entirety of client-side application window 108(1)' while the resize action is in progress. This means that the size of server-side application window 108(1) will not match the size of client-side application window 108(1)' during the resize (since the server-side window will remain static while the client-side window will be actively redrawn based on the user's inputs). In this scenario, one approach for live-updating client-side application window 108(1)' while the resize is occurring is to employ a workflow similar to flowchart 500 of FIG. 5, but include an extra step of scaling the source rectangle prior to blitting its contents to client-side application window 108(1)'. For example, if the source rectangle is 100×100 pixels in size while the client-side window has been resized to 300×300 pixels, the source rectangle can be scaled by a factor of three in each dimension before being blitted to the window. Unfortunately, a significant drawback of this approach is that the scaling can introduce artifacts that are visually unpleasant or distracting, particularly if the size difference between the client and server-side windows is large.

Figure 6:
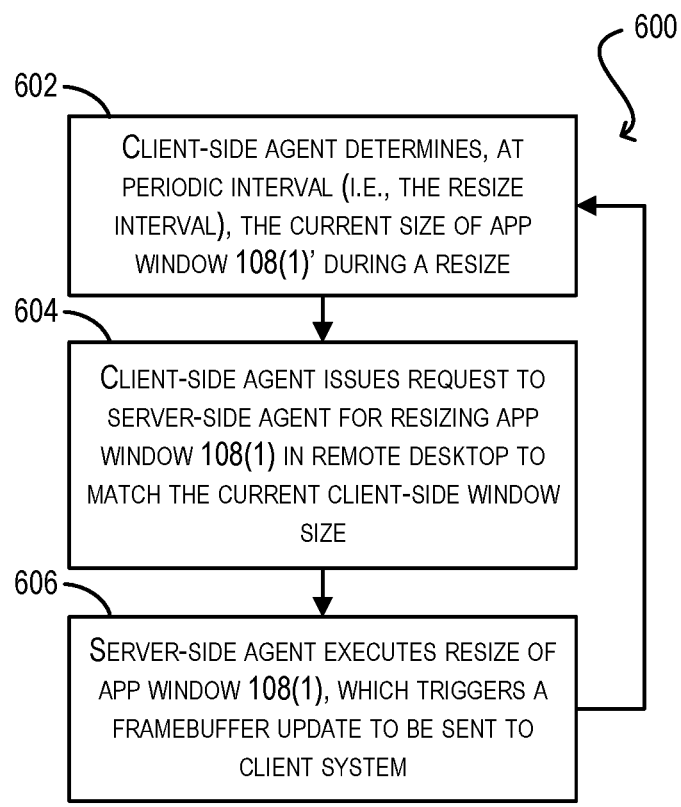
FIG. 6 depicts a second flowchart for performing live-updating of a client-side application window during a window resize action according to an embodiment.

An alternative approach, shown as flowchart 600 in FIG. 6, is to periodically resize server-side application window 108(1) during the resize process to match the changing size of client-side application window 108(1)'. For example, at block 602, client-side agent 252 can determine, at a periodic interval (also referred to as the "resize interval"), the current size of client-side application window 108(1) while the window is being resized (per step (4) of workflow 300). The length of this periodic interval can be configured by a user and can be set to, e.g., 100 ms, 250 ms, or the like.

Client-side agent 252 can then issue a request to server-side agent 250 for resizing server-side application window 108(1) to match the current size of client-side window 108(1)' (block 604). Finally, server-side agent 250 can execute the requested resize of server-side application window 108(1), thereby updating the visual state of the window and triggering a framebuffer update to be sent to client system 104(1) (block 606). Workflow 600 can then return to block 602 so that it can be repeated for the next periodic interval, and this can continue until the resize operation is completed.

With the approach shown in FIG. 6, when the framebuffer update is received by client-agent 252 for live-updating the contents of client-side application window 108(1)', the source rectangle corresponding to the server-side window will more closely match the current size of the client-side window, and only a relatively small amount of scaling (if any at all) will be needed to for the source rectangle contents to fully fill the client-side window. Thus, the scaling artifacts mentioned previously can be reduced. It should be noted that, since the size of the server-side window is synchronized with the client-side window periodically based on the resize interval (rather than on a continuous basis), the user of client system 104(1) will likely see the contents of the client-side window as being pixelated/scaled for a fraction of a second and then clear, and then pixelated/scaled and then clear again in a repeating fashion during the resize. However, this will generally be visually preferable to simply scaling the source rectangle contents to fit into a dramatically different sized client-side window per the first approach above, since the effect of the scaling will not be as obvious.

Further, since the server-side application window is resized periodically based on the resize interval, the CPU resources and network bandwidth consumed by this process will generally be less than the non-optimized approach of resizing the server-side application window on a continuous basis. In some embodiments, the resize interval can be dynamically tuned based upon one or more criteria that are determined during the course of a resize action. For instance, in a particular embodiment, if client-side agent 252 detects that client-side application window 108(1)' has been resized by more than X %, the resize interval can be increased or decreased by a corresponding amount (e.g., Y % or Z ms). One of ordinary skill in the art will recognize other possible rules and criteria for dynamically modifying the resize interval in order to achieve a desired balance between visual fidelity on the client-side and resource usage on the server-side.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for optimizing window resize actions for a remoted application, wherein the remoted application has a server-side application window running within a remote desktop of a server system, and wherein the server-side application window is made accessible to a user of a client system in the form of a client-side application window displayed in a client desktop of the client system, the method comprising:

transmitting, by the server system to the client system, a notification that the server-side application window is being resized in the remote desktop;

receiving, by the server system from the client system, a resize cancel message indicating that the server system should cancel resizing of the server-side application window in the remote desktop, wherein the client system transmits the resize cancel message in response to determining that the user is currently entering one or more input commands indicating that a window resize action for the client-side application window is in progress, and wherein the resize cancel message includes a user input event generated by the client system which indicates that the user has canceled the one or more input commands;

subsequently to receiving the resize cancel message, transmitting, by the server system to the client system, a plurality of framebuffer updates of the remote desktop while the window resize action for the client-side application window is in progress;

subsequently to transmitting the plurality of framebuffer updates, receiving, by the server system from the client system, a request to resize the server-side application window according to a final size of the client-side application window at completion of the window resize action; and resizing, by the server system, the server-side application window in accordance with the final size of the client-side application window.

2. The method of claim 1 wherein the server system detects that the server-side application window is being resized in the remote desktop via one or more window resizing messages sent by an operating system executing the remote desktop.

3. The method of claim 1 wherein upon receiving the resize cancel message, the server-side application window remains a fixed size in the remote desktop until the completion of the window resize action.

4. The method of claim 1 wherein, for each framebuffer update received from the server system, the client system:
  determines a portion of the framebuffer update corresponding to contents of the server-side application window;
  scales the portion to match a current size of the client-side application window; and
  draws the scaled portion within the client-side application window.

5. The method of claim 1 further comprising, subsequently to receiving the resize cancel message but prior to receiving the request:
  resizing, by the server system at a periodic interval, the server-side application window in the remote desktop to match a current size of the client-side application window in the client desktop.

6. The method of claim 5 wherein the periodic interval is dynamically changed based upon one or more criteria determined while the window resize action for the client-side application window is in progress.

7. A non-transitory computer readable storage medium having stored thereon program code executable by server system, the program code embodying a method for optimizing window resize actions for a remoted application, wherein the remoted application has a server-side application window running within a remote desktop of the server system, and wherein the server-side application window is made accessible to a user of a client system in the form of a client-side application window displayed in a client desktop of the client system, the method comprising:
  transmitting, to the client system, a notification that the server-side application window is being resized in the remote desktop;
  receiving, from the client system, a resize cancel message indicating that the server system should cancel resizing of the server-side application window in the remote desktop, wherein the client system transmits the resize cancel message in response to determining that the user is currently entering one or more input commands indicating that a window resize action for the client-side application window is in progress, and wherein the resize cancel message includes a user input event generated by the client system which indicates that the user has canceled the one or more input commands;
  subsequently to receiving the resize cancel message, transmitting, to the client system, a plurality of framebuffer updates of the remote desktop while the window resize action for the client-side application window is in progress;
  subsequently to transmitting the plurality of framebuffer updates, receiving, from the client system, a request to resize the server-side application window according to a final size of the client-side application window at completion of the window resize action; and
  resizing the server-side application window in accordance with the final size of the client-side application window.

8. The non-transitory computer readable storage medium of claim 7 wherein the server system detects that the server-side application window is being resized in the remote desktop via one or more window resizing messages sent by an operating system executing the remote desktop.

9. The non-transitory computer readable storage medium of claim 7 wherein upon receiving the resize cancel message, the server-side application window remains a fixed size in the remote desktop until the completion of the window resize action.

10. The non-transitory computer readable storage medium of claim 7 wherein, for each framebuffer update received from the server system, the client system:
  determines a portion of the framebuffer update corresponding to contents of the server-side application window;
  scales the portion to match a current size of the client-side application window; and
  draws the scaled portion within the client-side application window.

11. The non-transitory computer readable storage medium of claim 7 wherein the method further comprises, subsequently to receiving the resize cancel message but prior to receiving the request:
  resizing, at a periodic interval, the server-side application window in the remote desktop to match a current size of the client-side application window in the client desktop.

12. The non-transitory computer readable storage medium of claim 11 wherein the periodic interval is dynamically changed based upon one or more criteria determined while the window resize action for the client-side application window is in progress.

13. A server system comprising:
  a processor; and
  a non-transitory computer readable medium having stored thereon program code for optimizing window resize actions for a remoted application, wherein the remoted application has a server-side application window running within a remote desktop of the server system, and wherein the server-side application window is made accessible to a user of a client system in the form of a client-side application window displayed in a client desktop of the client system, the program code causing the processor to:
  transmit, to the client system, a notification that the server-side application window is being resized in the remote desktop;
  receive, from the client system, a resize cancel message indicating that the server system should cancel resizing of the server-side application window in the remote desktop, wherein the client system transmits the resize cancel message in response to determining that the user is currently entering one or more input commands indicating that a window resize action for the client-side application window is in progress, and wherein the resize cancel message includes a user input event generated by the client system which indicates that the user has canceled the one or more input commands;
  subsequently to receiving the resize cancel message, transmit, to the client system, a plurality of framebuffer updates of the remote desktop while the window resize action for the client-side application window is in progress;

subsequently to transmitting the plurality of framebuffer updates, receive, from the client system, a request to resize the server-side application window according to a final size of the client-side application window at completion of the window resize action; and resize the server-side application window in accordance with the final size of the client-side application window.

14. The server system of claim 13 wherein the server system detects that the server-side application window is being resized in the remote desktop via one or more window resizing messages sent by an operating system executing the remote desktop.

15. The server system of claim 13 wherein upon receiving the resize cancel message, the server-side application window remains a fixed size in the remote desktop until the completion of the window resize action.

16. The server system of claim 13 wherein, for each framebuffer update received from the server system, the client system:

determines a portion of the framebuffer update corresponding to contents of the server-side application window;

scales the portion to match a current size of the client-side application window; and draws the scaled portion within the client-side application window.

17. The server system of claim 13 wherein the program code further causes the processor to, subsequently to receiving the resize cancel message but prior to receiving the request:

resize, at a periodic interval, the server-side application window in the remote desktop to match a current size of the client-side application window in the client desktop.

18. The server system of claim 17 wherein the periodic interval is dynamically changed based upon one or more criteria determined while the window resize action for the client-side application window is in progress.

* * * * *